United States Patent Office 3,342,870
Patented Sept. 19, 1967

3,342,870
STABILIZED FORMALDEHYDE SOLUTIONS
Hilding R. Johnson, Wayne, and Eugene P. Di Bella, Rochelle Park, N.J., assignors to Tenneco Chemicals, Inc., a corporation of Delaware
No Drawing. Filed July 8, 1965, Ser. No. 470,597
8 Claims. (Cl. 260—606)

This is a continuation-in-part of copending patent application Ser. No. 134,128, which was filed on Aug. 28, 1961.

This invention relates to stabilized aqueous formaldehyde solutions and to methods for the stabilization of aqueous formaldehyde solutions against the separation of formaldehyde polymers. More particularly, it relates to the use of certain dialkanolamides as stabilizers for aqueous formaldehyde solutions.

Aqueous formaldehyde solutions of more than 30 percent concentration tend to become cloudy during handling or storage at low or moderate temperatures. Apparently some of the formaldehyde polymerizes, and the resulting water-insoluble polymers separate when the solution is allowed to stand or when its temperature is lowered below a critical level.

A number of stabilizers have been suggested for use in aqueous formaldehyde solutions to inhibit the formation of formaldehyde polymers or to prevent the separation of these polymers from the solution, but none has proven to be entirely satisfactory. For example, about 6 percent to 15 percent of methanol is commonly used to stabilize commercial formaldehyde solutions. This addition of methanol does not always impart the desired stability to the formaldehyde solution, and it may be technically objectionable in some uses of formaldehyde. In addition the amounts of methanol required for stabilization add appreciably to the cost of the formaldehyde solutions. Other stabilizers, such as alkoxylated sorbitan monoesters, polyvinyl alcohol, gelatin, or formoguanamine, do not provide the required stability when they are used in very small amounts, or they interfere with the reactions of formaldehyde when they are used in amounts sufficient to stabilize the solution. Still other suggested stabilizers have a tendency to cause foaming of the formaldehyde solution or to impart color to it.

In accordance with the present invention, it has been found that a very useful degree of stabilization of aqueous formaldehyde solutions against the formation and separation of formaldehyde polymers can be achieved by incorporating in the solutions small amounts of certain dialkanolamides.

The dialkanolamides that can be used in the practice of this invention are those that have the formula

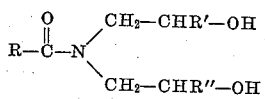

wherein R represents an alkyl group having from 9 to 17 carbon atoms and R′ and R″ each represents hydrogen or an alkyl group having from 1 to 3 carbon atoms. Illustrative of these dialkanolamides are the following:

N,N-bis (hydroxyethyl)-capramide,
N-(hydroxyethyl)-N-(2-hydroxybutyl)-capramide,
N,N-bis (2-hydroxypropyl)-lauramide,
N,N-bis (2-hydroxybutyl)-tridecanamide,
N,N-bis (hydroxyethyl)-myristamide,
N-(hydroxyethyl)-N-(3-hydroxypropyl)-myristamide,
N-(hydroxyethyl)-N-(2-hydroxybutyl)-myristamide,
N,N-bis (2-hydroxybutyl)-myristamide,
N,N-bis (2-hydroxyamyl)-myristamide,
N-(hydroxyethyl)-N-(2-hydroxyamyl)-myristamide,
N-(hydroxyethyl)-N-(3-hydroxypropyl)-palmitamide,
N,N-bis (2-hydroxybutyl)-palmitamide,
N,N-bis (hydroxyethyl)-stearamide,
N,N-bis (2-hydroxypropyl)-stearamide,
N-(hydroxyethyl)-N-(2-hydroxypropyl)-stearamide,
and the like.

Each of these dialkanolamides and mixtures thereof can be used to inhibit the formation of formaldehyde polymers and their separation from aqueous formaldehyde solutions.

Aqueous formaldehyde solutions having exceptionally good stability and other properties have been obtained by using as the stabilizer one or more dialkanolamides having the formula

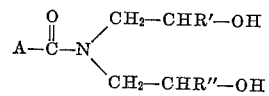

wherein A represents an alkyl group having from 13 to 15 carbon atoms and R′ and R″ each represents hydrogen or an alkyl group having from 1 to 3 carbon atoms. This preferred group of stabilizers includes, for example, N-(hydroxyethyl)-N-(2-hydroxypropyl)-myristamide,
N,N-bis (2-hydroxypropyl)-palmitamide,
N-(hydroxyethyl)-N-(2-hydroxypropyl)-palmitamide,
N-(hydroxyethyl)-N-(2-hydroxybutyl)-palmitamide, and
N-(hydroxyethyl)-N-(3-hydroxypropyl)-palmitamide.

The members of this preferred group of stabilizers inhibit the formation of formaldehyde polymers and their separation from aqueous formaldehyde solutions for prolonged periods of time at low temperatures. In addition when these stabilizers are used, the stabilized formaldehyde solutions have little or no tendency to foam and any foam that does form is readily dispersed. These dialkanolamides do not interfere with the reactions of the formaldehyde or impart color, odor, or other undesirable properties to the formaldehyde solutions.

The dialkanolamides which are used in accordance with this invention to stabilize aqueous formaldehyde solutions may be prepared by any suitable or convenient procedure. For example, they may be prepared by the reaction of the appropriate fatty acid chloride with a stoichiometric excess of a dialkanolamine at a temperature in the range of 10°–30° C. The resulting dialkanolamides can be purified, if desired, by recrystallization from a hydrocarbon solvent, such as heptane.

The amount of the dialkanolamide that is used to stabilize aqueous formaldehyde solutions can be varied within wide limits and is generally the minimum amount that will produce the desired stabilization effect. While from approximately 30 p.p.m. to 10,000 p.p.m. (based on 37 percent formaldehyde) can be used, in most cases the stabilized solution contains approximately 50 p.p.m. to 500 p.p.m. (based on 37 percent formaldehyde) of the stabilizer. When one of the aforementioned preferred dialkanolamides is used, optimum results are generally obtained from the use of 100 p.p.m. to 250 p.p.m. (based on 37 percent formaldehyde) of the stabilizer.

The mechanism by which the stabilization of the aqueous formaldehyde solutions is accomplished is not now fully understood. It appears, however, that the stabilization effect is largely dependent upon the molecular structure of the stabilizer and that both the fatty acid moiety and the dialkanolamide moiety are necessary for stabilization. This is supported by the observation that both monoalkanolamides of fatty acids and dialkanolamides of cycloaliphatic monocarboxylic acids and aliphatic dicarboxylic acids are completely ineffective as stabilizers for aqueous formaldehyde solutions. In addition, at the preferred stabilizer level of 100 p.p.m. the formaldehyde/amide mole ratio is of the order of $10^5/1$, which suggests that the stabilization results from stereospecific alteration of the solvent structure rather than from protective colloid action. Thus it appears most likely that the interaction of the hydroxyl groups of the dialkanolamide with growing polyoxymethylene chains in solution creates a three-dimensional network effect which substantially prevents the crystallization and separation of low molecular weight formaldehyde polymers.

The formaldehyde solutions to be stabilized in accordance with this invention are those normally sold in commerce. They may contain from approximately 30 percent to 60 percent or more formaldehyde. They may contain small amounts of methanol, formic acid, and other compounds that are ordinarily present in commercial formaldehyde solutions as well as small amounts of other stabilizers, defoaming agents, and the like.

The dialkanolamide stabilizers of this invention may be incorporated into an aqueous formaldehyde by any convenient technique. It is desirable, however, that the formaldehyde be in aqueous solution and predominantly in the monomeric state when the stabilizer is added. This may be accomplished by adding the stabilizer to a freshly-produced formaldehyde solution or by adding it to a solution that has been heated at a temperature in the range of approximately 50° C. to 100° C. to depolymerize any formaldehyde polymers that have formed, with the higher temperatures being used at the higher formaldehyde concentrations. The stabilizer may be added all at once or portionwise to the formaldehyde solution; alternatively, it may be added to a small amount of the formaldehyde solution to form a concentrated solution that is then added to a large amount of the formaldehyde solution.

Occasionally the stabilized formaldehyde solutions of this invention develop haze when they are cooled to room temperature. Filteration of the stabilized solutions at a temperature between approximately 25° C. and 50° C. through a Seitz-type pressure filter having an average pore size of 0.05 micron to 0.5 micron yields solutions that remain perfectly clear even on storage at 15° C. for prolonged periods.

This invention is further illustrated by the examples that follow. In these examples all parts and percentages are parts by weight and percentages by weight unless otherwise specified.

Example 1

A series of dialkanolamides was prepared by the following procedure: One molar equivalent of a fatty acid chloride was added to three molar equivalents of a dialkanolamine in chloroform solution at 15°–20° C. After the resulting solution had been washed with a 5% sodium sulfate solution, the chloroform was removed by vacuum distillation. The dialkanolamides after purification by recrystallization from heptane were low-melting crystalline solids. The dialkanolamides that were prepared and their analyses are set forth in Table I.

TABLE I

| Ex. No. | Dialkanolamide | Percent Yield | Percent N | |
|---|---|---|---|---|
| | | | Calculated | Found |
| 1A | N,N-bis (hydroxyethyl)-capramide | 71 | 5.41 | 5.49 |
| 1B | N,N-bis (hydroxyethyl-lauramide | 85 | 4.88 | 4.81 |
| 1C | N,N-bis (hydroxyethyl)-myristamide | 82 | 4.44 | 4.42 |
| 1D | N,N-bis (2 hydroxypropyl)-capramide | 89 | 4.88 | 4.67 |
| 1E | N,N-bis (2-hydroxypropyl)-tridecanamide | 78 | 4.26 | 3.21 |
| 1F | N,N-bis (2-hydroxypropyl)-myristamide | 83 | 4.07 | 3.91 |
| 1G | N,N-bis (2-hydroxypropyl)-palmitamide | 65 | 3.77 | 3.52 |
| 1H | N,N-bis (2-hydroxypropyl)-stearamide | 84 | 3.51 | 3.27 |
| 1I | N,N-bis (2-hydroxybutyl)-myristamide | 70 | 3.77 | 3.66 |
| 1J | N,N-bis (2-hydroxybutyl)-palmitamide | 53 | 3.51 | 3.19 |
| 1K | N-(hydroxyethyl)-N-(2-hydroxypropyl)-myristamide | 88 | 4.26 | 4.10 |
| 1L | N-(hydroxyethyl)-N-(2-hydroxypropyl)-palmitamide | 78 | 3.92 | 4.09 |
| 1M | N-(hydroxyethyl)-N-(3-hydroxypropyl)-myristamide | 95 | 4.26 | 4.13 |
| 1N | N-(hydroxyethyl)-N-(3-hydroxypropyl)-palmitamide | 58 | 3.92 | 3.89 |
| 1O | N-(hydroxyethyl)-N-(2-hydroxybutyl)-myristamide | 59 | 4.07 | 4.05 |
| 1P | N-(hydroxyethyl)-N-(2-hydroxybutyl)-palmitamide | 70 | 3.77 | 3.74 |

Example 2

A series of stabilized aqueous formaldehyde solutions was prepared by the following procedure: To a 1000 ml. portion of 37% aqueous formaldehyde at 70°–80° C. was added 100 p.p.m. (based on the weight of 37 percent formaldehyde) of a fatty acid dialkanolamide. The mixture was stirred for 30 minutes, filtered at 70°–80° C., cooled, and stored at 15° C. The solutions were examined periodically for formation and separation of formaldehyde polymers. In each case the test was terminated when a slight amount of insoluble formaldehyde polymer was visible. The dialkanolamides used to stabilize the aqueous formaldehyde solutions and the results of the stability tests are set forth in Table II.

TABLE II

| Ex. No. | Stabilizer | Stability of Aqueous Formaldehyde Solution in Days at 15° C. |
|---|---|---|
| 2A | N,N-bis (hydroxyethyl) capramide | 7 |
| 2B | N,N-bis (hydroxyethyl) lauramide | 21 |
| 2C | N,N-bis (hydroxyethyl) myristamide | 39 |
| 2D | N,N-bis (2-hydroxypropyl) capramide | 7 |
| 2E | N,N-bis (2-hydroxypropyl)-tridecanamide | 19 |
| 2F | N,N-bis (2-hydroxypropyl)-myristamide | 38 |
| 2G | N,N-bis (2-hydroxypropyl)-palmitamide | 181 |
| 2H | N,N-bis (2-hydroxypropyl) stearamide | 17 |
| 2I | N,N-bis (2-hydroxybutyl)-myristamide | 25 |
| 2J | N,N-bis (2-hydroxybutyl)-palmitamide | 25 |
| 2K | N-(hydroxyethyl)-N-(2-hydroxypropyl)-myristamide | 116 |
| 2L | N-(hydroxyethyl)-N-(2-hydroxypropyl)-palmitamide | 118 |
| 2M | N-(hydroxyethyl)-N-(3-hydroxypropyl)-myristamide | 27 |
| 2N | N-(hydroxyethyl)-N-(3-hydroxypropyl)-palmitamide | 48 |
| 2O | N-(hydroxyethyl)-N-(2-hydroxybutyl)-myristamide | 34 |
| 2P | N-(hydroxyethyl)-N-(2-hydroxybutyl)-palmitamide | 102 |
| 2Q | None | 0–1 |

From the data in Table II it will be seen that while each of the dialkanolamides tested improved the stability of the aqueous formaldehyde solution, four of them, namely, N,N-bis (2-hydroxypropyl) palmitamide (Example No. 2G); N-(hydroxyethyl)-N-(2-hydroxypropyl) myristamide, (Example No. 2K); N-(hydroxyethyl)-N-(2-hydroxypropyl) palmitamide (Example No. 2L); and N-(hydroxyethyl)-N-(2-hydroxybutyl) palmitamide (Example No. 2P) proved to be exceptionally valuable as stabilizers since when they were used at the rate of 100 p.p.m. the resulting aqueous formaldehyde solutions were stable at 15° C. for more than 100 days.

*Example 3*

The tendency of the formaldehyde solutions shown in Table II to have outstanding stability, that is, Example No. 2G, 2K, 2L, and 2P, to foam was evaluated by pumping the solutions at 25° C. at the rate of approximately 285 ml./sec. using an Eastern D-11 centrifugal pump. The stabilized solutions exhibited an initial foam level of 0.5 inch or less; this foam was dispersed rapidly by gentle agitation of the solution.

*Example 4*

A series of stabilized formaldehyde solutions was prepared by adding to aqueous formaldehyde solutions, some of which contained methanol, 250 p.p.m. (based on 37 percent formaldehyde) of a mixture of dialkanolamides obtained by condensing diethanolamine with mixed $C_{12-18}$ fatty acids. The stability of the solutions was then determined by storage at various temperatures. The results of these tests are summarized in Table III.

TABLE III

| Ex. No. | Formaldehyde Content of Solution (Percent) | Methanol Content of Solution (Percent) | Storage Temperature (° C.) | Stability of Aqueous Solution (in Days) |
|---|---|---|---|---|
| 4A | 37 | 0 | 15 | 27 |
| 4B | 37 | 6 | 8.7 | 15 |
| 4C | 37 | 12 | 5 | 30 |
| 4D | 44 | 0 | 37.5 | 18 |
| 4E | 44 | 6 | 37.5 | 25 |
| 4F | 50 | 0 | 50 | 12 |

*Example 5*

For comparative purposes, amides other than those herein shown to be useful as stabilizers for aqueous formaldehyde solutions were evaluated as stabilizers by the procedure described in Example 2. The results of these tests are summarized in Table IV.

TABLE IV.—COMPARATIVE TESTS

| Ex. No. | Amide | Stability of Aqueous Formaldehyde Solution in Days at 15° C. |
|---|---|---|
| 5A | N,N-bis (hydroxyethyl) abietamide | 2 |
| 5B | N,N-bis (2-hydroxypropyl) abietamide | 2 |
| 5C | N-hydroxyethyllauramide | 2 |
| 5D | N-2-hydroxypropyllauramide | 2 |
| 5E | N-hydroxyethylstearamide | 1 |
| 5F | N,N-bis (hydroxyethyl) amide of dimerized fatty acids | 1 |
| 5G | N,N-bis (2-hydroxypropyl) amide of dimerized fatty acids | 1 |
| 5H | N-hydroxyethyl amide of coconut oil fatty acids | 2 |
| 5I | N,N-bis (hydroxyethyl) amide of coconut oil fatty acids | 6 |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An aqueous formaldehyde solution stabilized against separation of formaldehyde polymers comprising aqueous formaldehyde of approximately 30 percent to 60 percent concentration and an amount sufficient to stabilize said solution against separation of formaldehyde polymers of a compound selected from the group consisting of N,N-bis (2-hydroxypropyl) palmitamide, N-(hydroxyethyl)-N-(2-hydroxypropyl) myristamide, N-(hydroxyethyl)-N-(2-hydroxypropyl) palmitamide, and N-(hydroxyethyl)-N-(2-hydroxybutyl) palmitamide.

2. An aqueous formaldehyde solution stabilized against separation of formaldehyde polymers comprising aqueous formaldehyde of approximately 30 percent to 60 percent concentration and approximately 50 p.p.m. to 500 p.p.m. of a compound selected from the group consisting of N,N-bis (2-hydroxypropyl) palmitamide, N-(hydroxyethyl)-N-(2-hydroxypropyl) myristamide, N-(hydroxyethyl)-N-(2-hydroxypropyl) palmitamide, and N-(hydroxyethyl)-N-(2-hydroxybutyl) palmitamide.

3. An aqueous formaldehyde solution stabilized against separation of formaldehyde polymers comprising aqueous formaldehyde of approximately 30 percent to 60 percent concentration and 100 p.p.m. to 250 p.p.m. of a stabilizer selected from the group consisting of N,N-bis (2-hydroxypropyl) palmitamide, N-(hydroxyethyl)-N-(2-hydroxypropyl) myristamide, N-(hydroxyethyl)-N-(2-hydroxypropyl) palmitamide, and N-(hydroxyethyl)-N-(2-hydroxybutyl) palmitamide.

4. An aqueous formaldehyde solution as set forth in claim 3 wherein the stabilizer is N-(hydroxyethyl)-N-(2-hydroxypropyl)-myristamide.

5. An aqueous formaldehyde solution as set forth in claim 3 wherein the stabilizer is N,N-bis (2-hydroxypropyl)-palmitamide.

6. An aqueous formaldehyde solution as set forth in claim 3 wherein the stabilizer is N-(hydroxyethyl)-N-(2-hydroxypropyl)-palmitamide.

7. An aqueous formaldehyde solution as set forth in claim 3 wherein the stabilizer is N-(hydroxyethyl)-N-(2-hydroxybutyl)-palmitamide.

8. The method of forming a clear stable aqueous formaldehyde solution of approximately 30 percent to 60 percent concentration which comprises the steps of (i) incorporating in said formaldehyde solution 100 p.p.m. to 250 p.p.m. of a stabilizer selected from the group consisting of N,N-bis(2-hydroxypropyl) palmitamide, N-(hydroxyethyl)-N-(2-hydroxypropyl) myristamide, N-(hydroxyethyl)-N-(2-hydroxypropyl) palmitamide, and N-(hydroxyethyl)-N-(2-hydroxybutyl) palmitamide and (ii) filtering said stabilized solution at a temperature between 25° C. and 50° C. through a pressure filter having an average pore size of 0.05 micron to 0.5 micron.

References Cited

UNITED STATES PATENTS

| | | |
|---|---|---|
| 2,736,641 | 2/1956 | Mattson et al. _____ 252—403 |
| 3,107,258 | 10/1963 | Lamberti et al. _____ 260—404 |
| 3,192,268 | 6/1965 | Butter _____ 260—606 |
| 3,211,766 | 10/1965 | Magne et al. _____ 260—404 |
| 3,214,447 | 10/1965 | Butter _____ 260—606 |
| 3,214,476 | 10/1965 | Butter _____ 260—606 |

LEON ZITVER, *Primary Examiner.*

DANIEL D. HORWITZ, *Examiner.*

R. H. LILES, *Assistant Examiner.*